(12) United States Patent
Kattar

(10) Patent No.: US 7,204,030 B1
(45) Date of Patent: Apr. 17, 2007

(54) LASER TOOL

(76) Inventor: David A. Kattar, 1028 W. Washington St., West Bend, WI (US) 53095

( * ) Notice: Subject to any disclaimer, the term of this patent is extended or adjusted under 35 U.S.C. 154(b) by 0 days.

(21) Appl. No.: 11/172,027

(22) Filed: Jul. 1, 2005

(51) Int. Cl.
*G01B 3/56* (2006.01)
(52) U.S. Cl. .......................................... 33/451; 33/286
(58) Field of Classification Search ................ 33/451, 33/286, 365, 366.11
See application file for complete search history.

(56) References Cited

U.S. PATENT DOCUMENTS

| | | | | |
|---|---|---|---|---|
| 3,522,657 A | * | 8/1970 | Metrulis | 33/451 |
| 5,163,228 A | * | 11/1992 | Edwards et al. | 33/1 N |
| 5,519,942 A | * | 5/1996 | Webb | 33/451 |
| 5,531,031 A | * | 7/1996 | Green | 33/286 |
| 5,713,135 A | * | 2/1998 | Acopulos | 33/451 |
| 5,842,282 A | * | 12/1998 | Ting | 33/227 |
| 6,826,843 B2 | * | 12/2004 | Lam et al. | 33/1 PT |
| 6,890,312 B1 | * | 5/2005 | Priester et al. | 33/534 |

OTHER PUBLICATIONS

Kell-Strom, Pro 360/3600 Digital Protractor and KS5589 Laser Module Attachment. Viewed at www.kell-strom.com/tools/kstools/protract/5589page.htm. Viewed on Oct. 10, 2005.

* cited by examiner

*Primary Examiner*—Christopher W. Fulton
(74) *Attorney, Agent, or Firm*—Brannen Law Office, LLC

(57) ABSTRACT

The present invention has a body with front and back surfaces, top and bottom sides, and two opposed ends. A display panel is on the front of the body. A processor is housed within the body. A dial can be connected to the front end of the body. The dial can have a head with an opening therein for allowing a laser beam to be projected from the head. A grid can be on the head for manually determining the angle between the longitudinal axis of the body and the head. The processor can electronically determine the angle between the longitudinal axis of the body and the head. The head can project forward from the front surface of the body. A side of the body can abut the side of a piece of material to be cut. A laser line can then be projected onto the material surface.

13 Claims, 7 Drawing Sheets

LASER TOOL

BACKGROUND OF THE INVENTION

1. Field of the Invention

The present invention relates to a laser tool, and more particularly to a laser tool that is useful in measuring an angle and for projecting a laser line onto a surface at a predetermined angle from the longitudinal axis of the laser tool.

2. Description of the Related Art

Professional carpenters and homeowners alike frequently need to measure angles and draw chalk lines onto surfaces so that the material can be cut to the measured angle. One situation in particular where people need to measure angles is when cutting drywall, or paneling, to complete the wall of room having a cathedral ceiling. Certainly it will be appreciated that there are many more situations for which the measurement of an angle is necessary. However, for illustrative purposes, this situation in particular will be described.

Several methods have been used in order to determine and cut drywall at a desired angle. Perhaps the simplest way is to make an estimate, or guess. This however, may lead to unintended problems and inefficiencies. For example, the person may guess that an angle is larger than it really is. In such an event, the person would have to re-cut the drywall to a more appropriate size. This is both time consuming and wasteful. Alternatively, the person may guess that an angle is smaller than it really is. In such an event, the person will cut the drywall to too small of angle. The person will then need to cut a new sheet of drywall having more appropriate dimensions, or will need to use an undesired amount of drywall compound to complete the task. The process of cutting additional sheets of drywall is wasteful. Using more effort and drywall compound than necessary to finish a wall is both wasteful and time consuming.

Given the inherent drawbacks associated with guessing, some people use a conventional protractor to assist them in determining the angle between the ceiling and the wall. This method works well for its intended purpose. However, it is not without some limitations in its own regard. For example, a conventional protractor typically has relatively short arms that intersect at a pivoted connection. The arms can be used to contact two surfaces from which the angle there between needs determining. Yet, sometimes there are not two surfaces for which to contact the arms against. Also, the angle at the intersection of two surfaces may not be accurate of the true angle between the two surfaces a given distance from the intersection.

Still further, when using the conventional protractor, the user must still mark a chalk line or manually draw a cut line onto the surface of a piece of material to be cut. When the angle is even slightly incorrect, the error in the cut line will become more significant as the length of the line increases. Such an event can become prevalent when cutting sheets of material measuring 4 feet by 8 feet. Also, a person can forget or become confused as to the proper angle to be cut. Further, the confusion can become more likely to occur if the person is to remember multiple angles. Of course, the person can write down the angles. However, the person must carry a writing utensil and paper or an alternative writing surface if they elect to write angles down.

A further limitation of conventional protractors is that a person can bump or move one arm with respect to the other. This could happen before the person reads the angle, causing the person to misread the proper angle. Further, frequent blows or even a substantial single blow could cause damage to the arms or rotatable pivot.

A device is sold by Kell-Strom under the model PRO 360/3600 Digital Protractor and KS5589 Laser Modul Attachment. This Kell-Strom device purports to allow for defining distant angles, reference datums, sectional planes and waterlines. This product may work well for its intended purposes, but it is not without limitations. For example, the Kell-Strom device has a body with a laser being emitted from one end of the body, and has an arm that is rotatably connected to the body at one end of the bottom of the body. One limitation is that it may be difficult to use the Kell-Strom device in tight spaces, such is in attics to find the angles of the truss.

A further limitation of the Kell-Strom device is, like conventional protractors, that the arm may be damaged if it is hit. This could lead to both inaccurate readings and premature failure of the device.

A still further limitation of the Kell-Strom device is that the laser projects a beam from an end of the body. It appears that the laser projects from a plane that is between the plane in which the front lies in and the plane in which the back lies in. It appears that it is not possible to abut the Kell-Strom device against the side of an object to be cut in order to project a line onto the surface of the object to be cut. Apparently, the person needs to lift the device to an appropriate level to allow the laser to mark a line across the top surface of an adjacent piece of material. Such a limitation causes less than optimal stability and can lead to inaccurate results.

A still further limitation yet of the Kell-Strom device is that the laser projects from a point remote from the axis of rotation of the arms. Such a limitation could manifest itself when attempting to determine a cut line relatively close to the axis of rotation, when the laser is more distal than the desired start of the cut line.

A still further limitation yet of the Kell-Strom device is that it is unidirectional. The device can only be used to determine angles that lie in one direction away from the main body. Coupled with the size limitations, the person may have difficulty using the Kell-Strom device in certain applications. Further, the arm in the Kell-Strom device is incapable of a full 360 degrees of rotation relative to the body.

Thus there exists a need for a laser tool that solves these and other problems.

SUMMARY OF THE INVENTION

The present invention relates to a laser tool, and more particularly to a laser tool that is useful in measuring an angle and for projecting a laser line onto a surface at an angle equal to the measured angle. The present invention has a body with a front side with a front side area and a back side, a top side and a bottom side, and two opposed ends. A display panel can be on the front of the body. A processor can be housed within the body. A dial can be connected to the front end of the body and can be operable in the front side area. The dial can have a head with an opening therein for allowing a laser beam to be projected from the head. A grid can be on the head for manually determining the angle between the longitudinal axis of the body and the dial. The processor can electronically determine the angle between the longitudinal axis of the body and the dial. The head of the dial can project forward from the front surface of the body. A side of the body can abut the side of a piece of material to be cut. A laser beam can be projected from the head onto the surface of the piece of material because the head is forward of the front surface of the body.

According to one aspect of the present invention, the user can place the tool against a surface and the tool can determine the angle of the longitudinal axis of the tool with respect to a selected reference plane. To accomplish this, a set button can be provided to allow the user to toggle between reference planes, and therefore determine the proper level angle relative to the desired reference plane, which could be a vertical wall or horizontal floor.

According to another aspect of the present invention, the dial or hub of the present invention operates within the area of the front surface. The present invention eliminates the need for a separate arm for determining angles. Accordingly, the present invention eliminates the risk of damage to an arm. Further, elimination of the arm, coupled with an elongated body having a height substantially less than the length, allows the present invention to be used in relatively tight spaces.

According to another aspect of the present invention, the laser is projected from an area within the front surface of the present invention. The laser line starts at or near the edge of a surface on which the laser is projected onto. This eliminates segments on the surface of the material that is unmarked by the laser line.

According to yet another aspect of the present invention, the head of the dial extends forward from the front surface of the present invention. The laser line is then fanned downward and outward starting at the location forward of the front surface. The side surface of the body can be abut the side of the surface of the material to be cut. The laser line is then projected across all, or nearly across all, of the surface to be cut.

According to a still further aspect of the present invention, the dial is rotatable a full 360 degrees with respect to the main body. The present invention is usable in many situations while the display is viewable to the user.

Other advantages, benefits, and features of the present invention will become apparent to those skilled in the art upon reading the detailed description of the invention and studying the drawings.

DETAILED DESCRIPTION OF THE PREFERRED EMBODIMENTS

Figure 1:
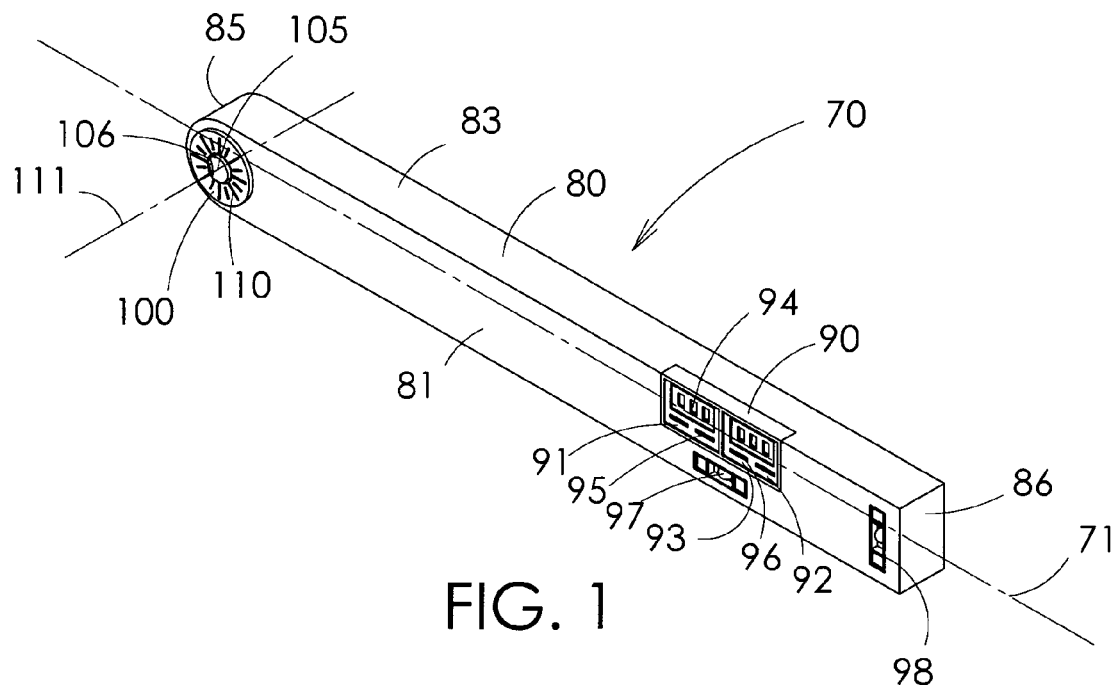
FIG. 1 is an exploded view of a preferred embodiment of the present invention.
Figure 2:
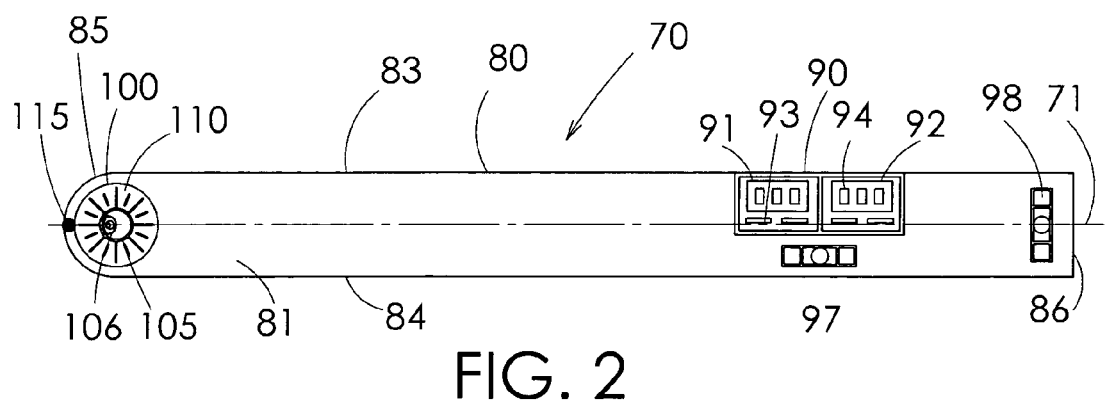
FIG. 2 is a front view of the preferred embodiment of the present invention shown in FIG. 1.
Figure 3:
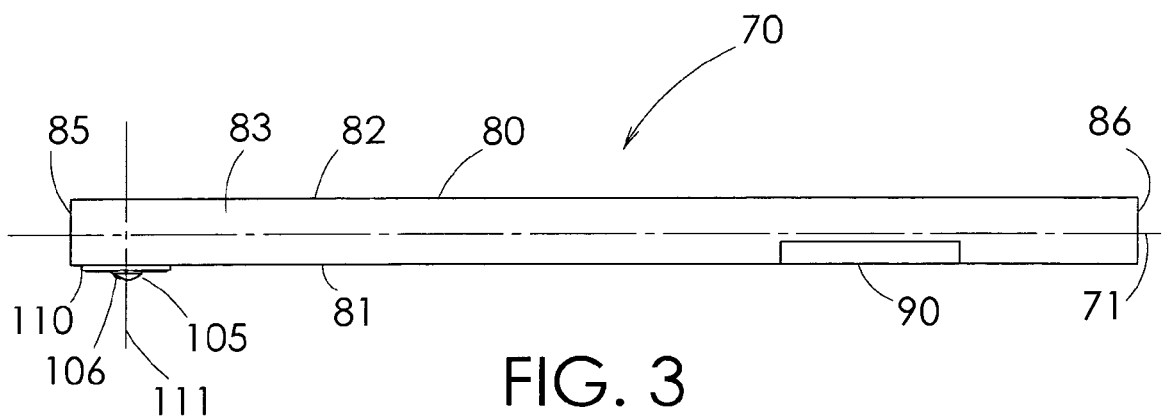
FIG. 3 is a top view of the preferred embodiment of the present invention shown in FIG. 1.
Figure 4:
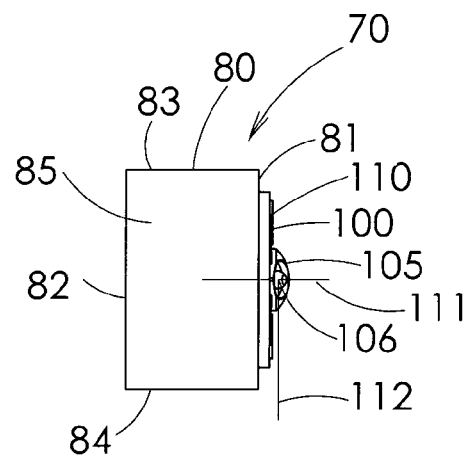
FIG. 4 is an end view of the preferred embodiment of the present invention shown in FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning to FIGS. 1–4, a laser tool 70 is provided. The laser tool 70 has a longitudinal axis 71. The laser tool 70 has a body 80. The body 80 has a front side or surface 81 and an opposed rear side or surface 82. A top side 83 and bottom side 84 are also provided. The body has a first end 85 and a second end 86. The front and rear surfaces 81 and 82 are preferably generally rectangularly shaped, and preferably define respective surface areas that are preferably approximately 2 feet long by 2.5 inches tall. The first end 85 of the front surface is preferably rounded. The front surface 81, rear surface 82, top side 83, bottom side 84 first end 85 and second end 86 define the outside surface of the body 80. The body 80 has an interior (not shown). It will be understood that the dimensions provided are preferred dimensions and that the dimensions can be changed without departing from the broad aspects of the present invention.

A display panel 90 is preferably connected to the front surface 81 of the body. The display panel 90 can have electric displays, such as one or more level displays 91, one or more laser displays 92, one or more buttons 93 and one or more indicators 94. One button 93 is preferably a hold button 95. A user can use the hold button 95 to lock or hold the reading on the level display 91. Further, the display panel 90 can comprise a set button 96. Pressing the set button 95 toggles or changes between reference planes. Accordingly, the level display 91 will display the angle between the longitudinal axis 71 of the tool 70 and the selected reference plane. In preferred uses, the level display 91 can display the angle of the longitudinal axis 71 relative to a horizontal floor or a vertical wall. The laser display 92 can display the angle between a laser beam (discussed later) and the longitudinal axis 71 of the laser tool 70. A processor (not shown) is preferably housed within the body 80 and is in electrical communication with the display panel 90. The processor is preferably capable of executing instructions inputted from the buttons 93, determining angles, storing angles, and outputting information to the appropriate display. The level display 91 and laser display 92 preferably display angles to one tenth of a degree.

A first manual level 97 is provided for manually determining whether the longitudinal axis 71 is horizontal. The first manual level 97 is preferably located along the bottom of the front surface 81 intermediate the first end 85 and second end 86. A second manual level 98 is also provided for manually determining whether the second end 86 of the tool 70 is horizontal. The second manual level 98 is preferably located at the second end 86 of the tool 70.

A dial 100, or hub, is provided. The hub has a head 105, or housing, with an opening 106 there through. The head preferably extends away from the front surface 81 of the body 80. A fanning laser beam 107 can be projected through the opening 106 in the head 105 along a laser beam line 108. The dial can further have a grid 110 having angle markings. The dial can rotate along a dial rotational axis 111. Rotational axis 111 is preferably generally perpendicular to the longitudinal axis 71 of the tool. In this regard, the dial 100 can be used to measure angles in a plane 112 that is generally parallel with the longitudinal axis. The dial is rotatable a full 360 degrees about the rotational axis 111. It is preferable that the dial 100 be operable completely within the surface area of the front surface 81 of the body. In this regard, no part of the dial 100 preferably extends beyond the edges of the front surface.

A reference marking 115 is preferably on the front surface 81 of the body 80. The marking 115 will allow the user to manually determine the angle between a projected laser beam 107 and the longitudinal axis 71 of the laser tool 70.

A laser generator (not shown) is preferably located within the housing. In a preferred manufacturing detail, the laser generator projects a laser generally along the longitudinal axis. A mirror (not shown) can be provided at a 45 degree angle to deflect the laser from the longitudinal axis to a beam along the rotational axis of the dial. Then another mirror can be located in the head 105 to deflect the beam out through the opening 106 in the head 105. In this regard, at any angle that the dial 100 is rotated to, the laser beam 107 is projectable from the head 105 in a plane 112 that is parallel to the plane of the front surface 81 of the body 80. The processor can determine the angle between the laser beam 107 and the longitudinal axis 71 by determining the amount of rotation of the dial 100.

The two mirrors (not shown) can be spaced any given amount, and they can have different angles so long as a beams before and after the two mirror deflections will be parallel and offset.

Figure 5:
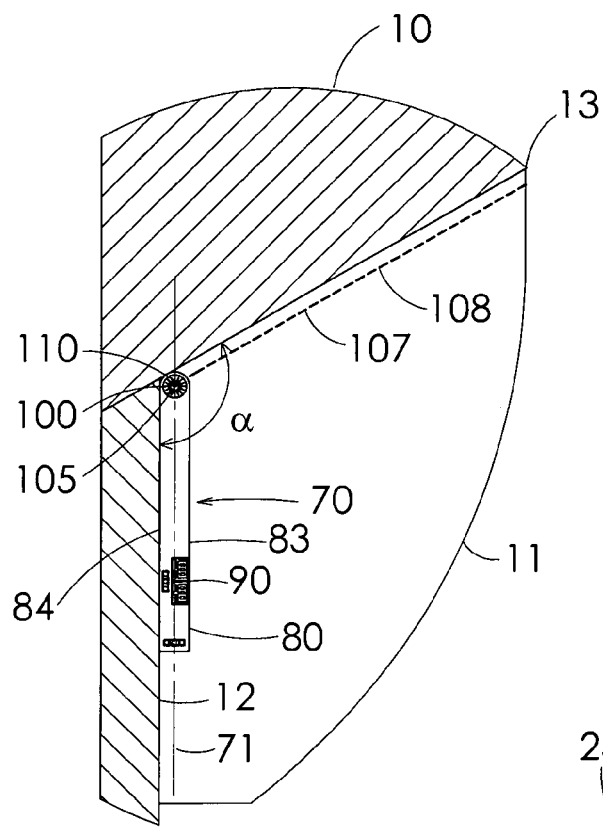
FIG. 5 is a schematic view of the preferred embodiment of the present invention shown in an intended environment making an angle determination of an obtuse angle.

Turning now to FIG. 5, a preferred use of the present invention is shown wherein the laser tool 70 is used to measure an obtuse angle, alpha. Accordingly, the tool 70 can be used in a room 10 having a first wall 11, a second wall 12 and a cathedral ceiling 13. In FIG. 5, the second wall 12 is on the left side of the room. To determine the angle between the second wall 12 and the ceiling 13, the user can place the bottom side 84 of the tool 80 against the second wall 12 with the second end 86 of the tool 70 at the intersection between the wall 12 and the ceiling 13. Then, the user can rotate the dial so that it projects a laser beam 107 parallel to the ceiling 13. The processor determines the angle between the longitudinal axis 71 and the laser beam 107, and can also determine how far the laser tool 70 is from level. The user can read the angle off from the laser display 92, or can alternatively manually determine the angle between the longitudinal axis 71 and the laser beam 107 by viewing the grid 110 on the dial 100 in comparison to the reference point 115 on the body 80. Alternatively, the body 80 can be placed against the ceiling 13 and the laser beam 107 could be projected down parallel to wall 12 to determine the angle.

Figure 6:
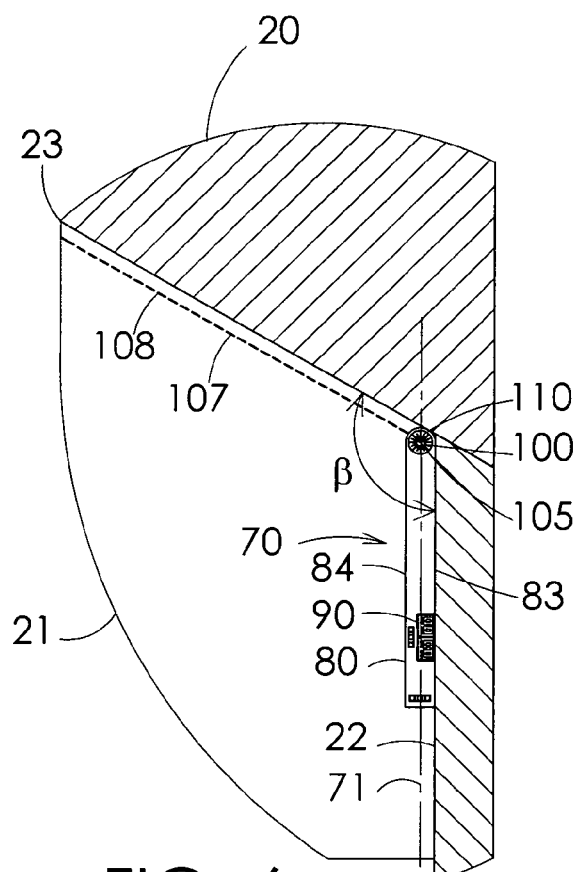
FIG. 6 is a schematic view of the preferred embodiment of the present invention shown in an intended environment making an angle determination of an obtuse angle.

Turning now to FIG. 6, another preferred use of the present invention is shown wherein the laser tool 70 is used to measure a second obtuse angle, beta. Accordingly, the tool 70 can be used in a room 20 having a first wall 21, a second wall 22 and a cathedral ceiling 23. In FIG. 6, the second wall 22 is on the right side of the room. To determine the angle between the second wall 22 and the ceiling 23, the user can place the top side 83 of the tool 80 against the second wall 22 with the second end 86 of the tool 70 at the intersection between the wall 22 and the ceiling 23. Then, the user can rotate the dial so that it projects a laser beam 107 parallel to the ceiling 23. The processor determines the angle between the longitudinal axis 71 and the laser beam 107, and can also determine how far the laser tool 70 is from level. The user can read the angle off from the laser display 92, or can alternatively manually determine the angle between the longitudinal axis 71 and the laser beam 107 by viewing the grid 110 on the dial 100 in comparison to the reference point 115 on the body 80. Alternatively, the body 80 can be placed against the ceiling 23 and the laser beam 107 could be projected down parallel to wall 22 to determine the angle.

Figure 7:
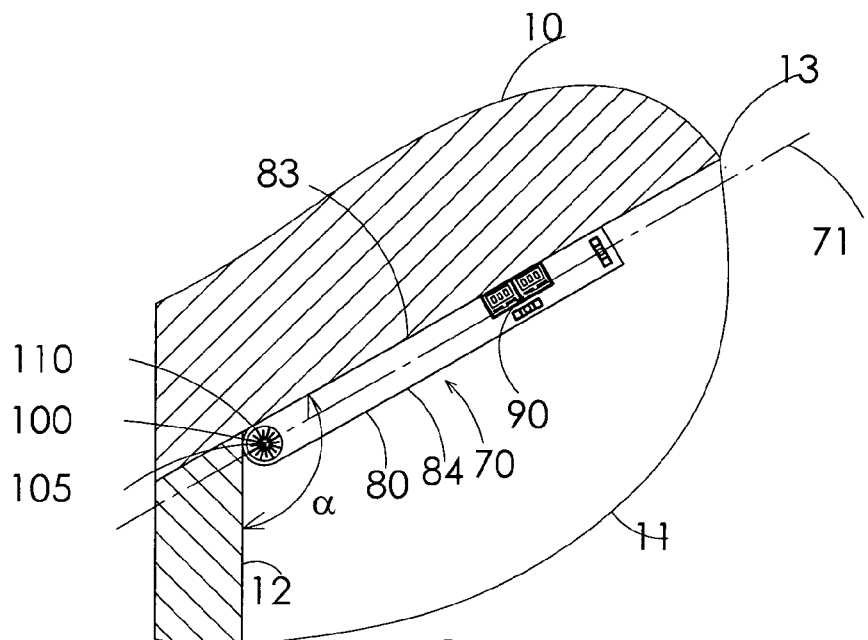
FIG. 7 is a schematic view of the preferred embodiment of the present invention shown in an intended environment making an angle determination of an obtuse angle.

Calling attention now to FIG. 7, a further preferred use of the present invention is shown. In FIG. 7, the top side 83 of the tool 70 abuts the ceiling 13. The user then presses the set button 96 to toggle between reference planes and select the vertical reference plane parallel to the wall 12. When the vertical reference plane is selected and the correct angle is displayed on the level display 91, the user can then press the hold button 95 to lock the measured angle on the level display 91.

Figure 8:
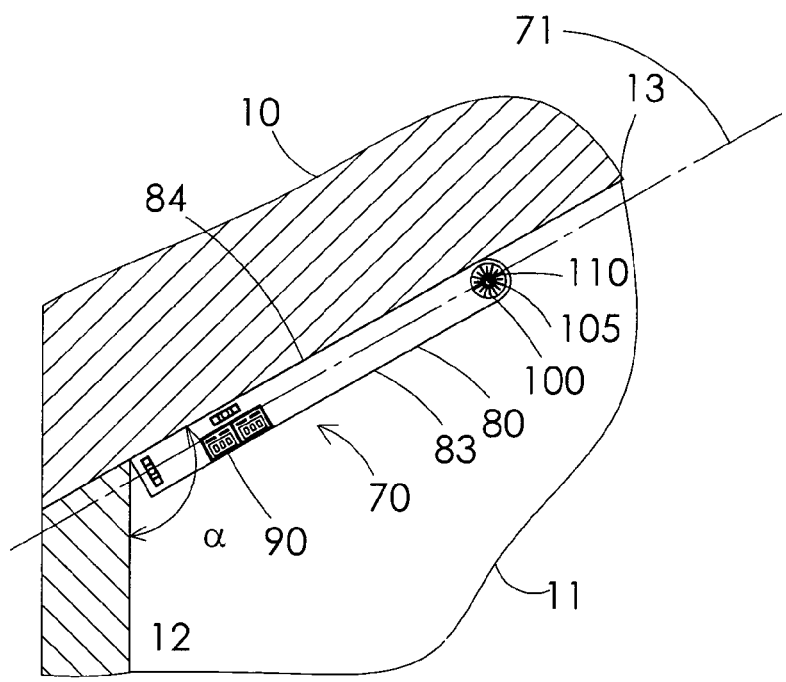
FIG. 8 is a schematic view of the preferred embodiment of the present invention shown in an intended environment making an angle determination of an obtuse angle.

The use of the present invention illustrated in FIG. 8 is similar to the use illustrated in FIG. 7 except that the tool 70 is in a different orientation with respect to the room 10 wherein the bottom side is against the ceiling 13. Yet, to determine the angle between the ceiling 13 and wall 12, the user simply needs to toggle between the reference planes until the correct measurement is displayed on the level display 91.

It is understood that while button 96 can toggle between any preset angle relative to the longitudinal axis 71, it is preferable that the preset toggle amounts at least include 90 degree increments.

Figure 9:
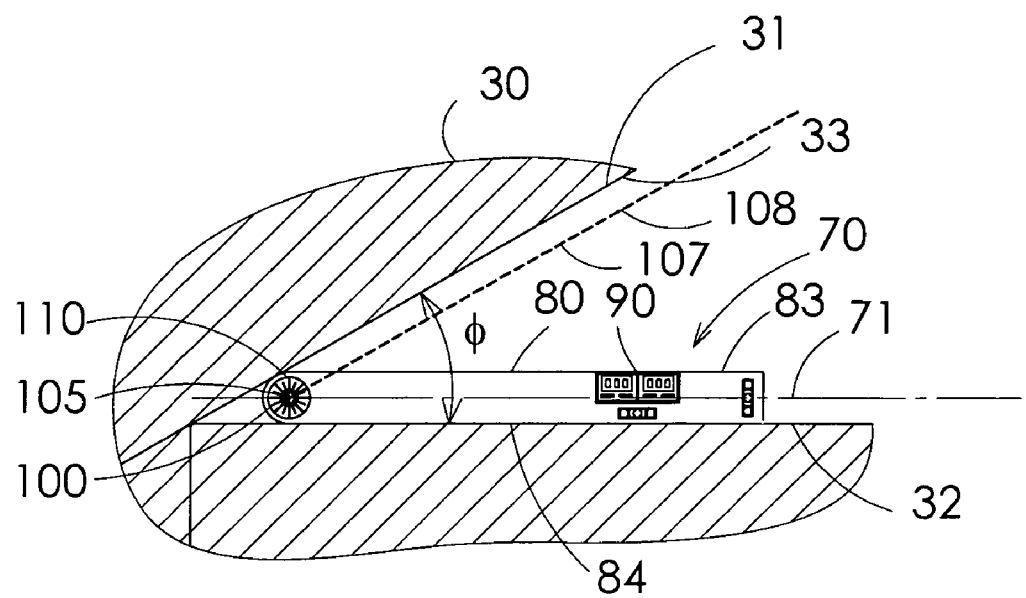
FIG. 9 is a schematic view of the preferred embodiment of the present invention shown in an intended environment making an angle determination of an acute angle.

Turning now to FIG. 9, a further preferred use of the present invention is shown wherein the laser tool 70 is used to measure an acute angle, phi, such as when measuring the angle of an attic truss. Accordingly, the tool 70 can be used in an attic 30 having a truss 31 with a floor member 32 and a roof member 33. In FIG. 9, the intersection of the floor member 32 and the roof member is on the left side. To determine the angle between the floor member 32 and the roof member 33, the user can place the bottom side 84 of the tool 80 against the floor member 32 with the second end 86 of the tool 70 at the intersection between the floor member 32 and the roof member 33. Then, the user can rotate the dial so that it projects a laser beam 107 parallel to the roof member 33. The processor determines the angle between the longitudinal axis 71 and the laser beam 107, and can also determine how far the laser tool 70 is from level. The user can read the angle off from the laser display 92, or can alternatively manually determine the angle between the longitudinal axis 71 and the laser beam 107 by viewing the grid 110 on the dial 100 in comparison to the reference point 115 on the body 80. Alternatively, the body 80 can be placed against the roof member 33 and the laser beam 107 could be projected parallel to the floor member 32 to determine the angle.

Figure 10:
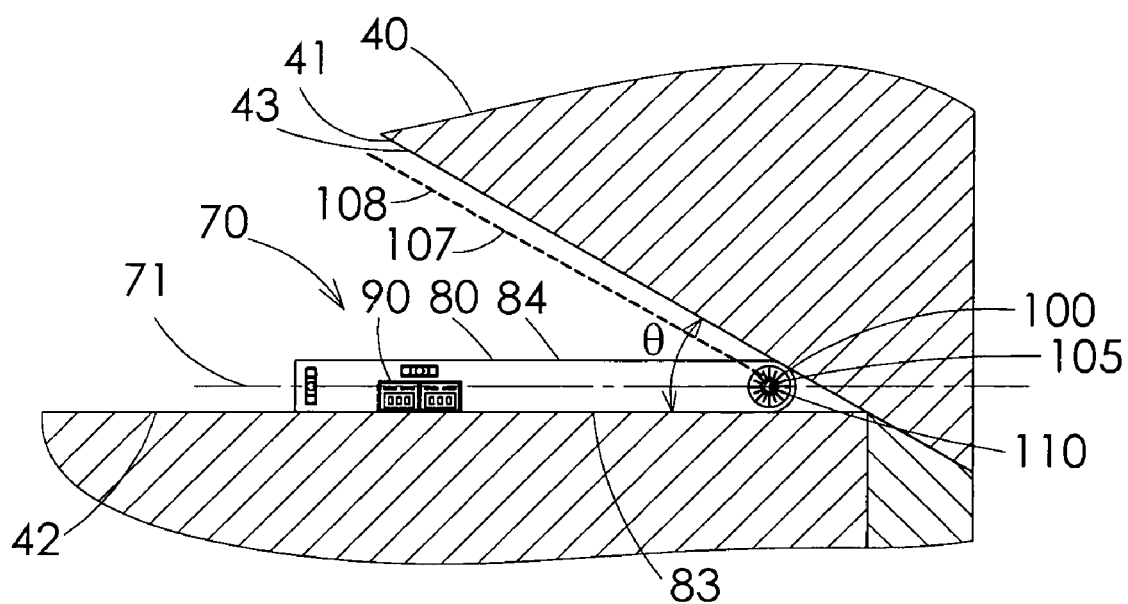
FIG. 10 is a schematic view of the preferred embodiment of the present invention shown in an intended environment making an angle determination of an acute angle.

Turning now to FIG. 10, a still further preferred use of the present invention is shown wherein the laser tool 70 is used to measure an acute angle, theta, such as when measuring the angle of an attic truss. Accordingly, the tool 70 can be used in an attic 40 having a truss 41 with a floor member 42 and a roof member 43. In FIG. 10, the intersection of the floor member 42 and the roof member 43 is on the right side. To determine the angle between the floor member 42 and the roof member 43, the user can place the top side 83 of the tool 80 against the floor member 42 with the second end 86 of the tool 70 at the intersection between the floor member 42 and the roof member 43. Then, the user can rotate the dial so that it projects a laser beam 107 parallel to the roof member 43. The processor determines the angle between the longitudinal axis 71 and the laser beam 107, and can also determine how far the laser tool 70 is from level. The user can read the angle off from the laser display 92, or can alternatively manually determine the angle between the longitudinal axis 71 and the laser beam 107 by viewing the grid 110 on the dial 100 in comparison to the reference point 115 on the body 80. Alternatively, the body 80 can be placed against the roof member 43 and the laser beam 107 could be projected parallel to the floor member 42 to determine the angle.

Figure 11:
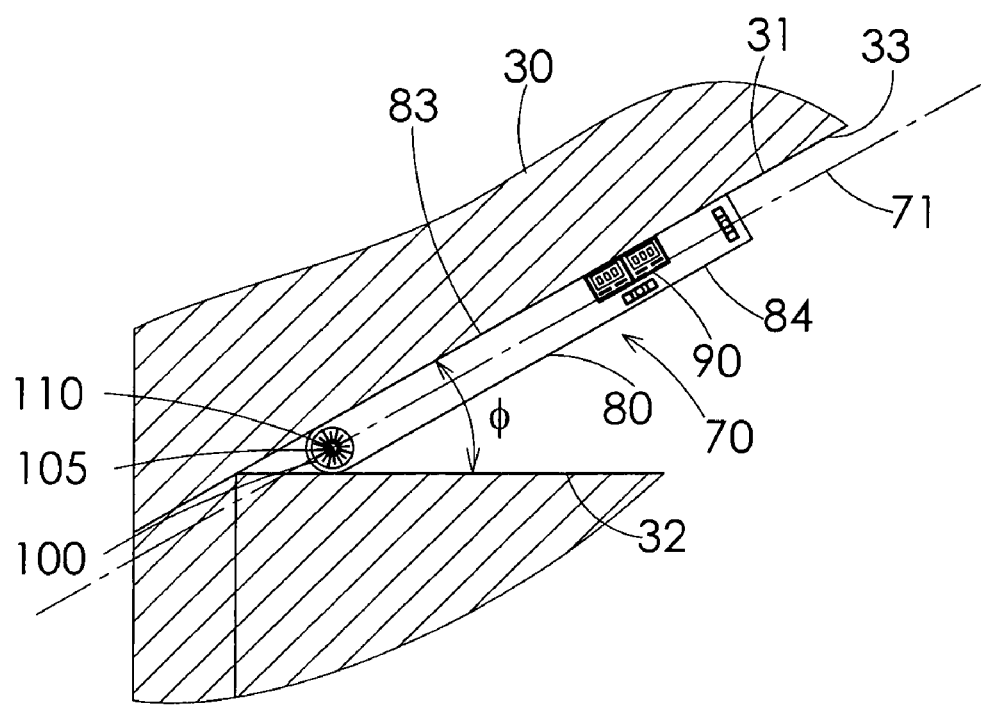
FIG. 11 is a schematic view of the preferred embodiment of the present invention shown in an intended environment making an angle determination of an acute angle.
Figure 12:
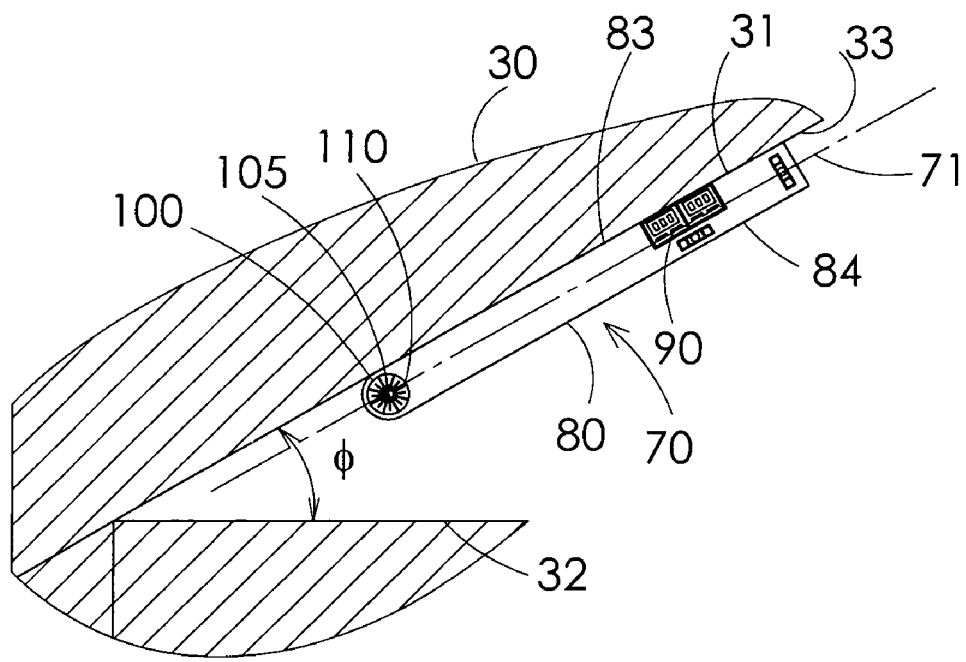
FIG. 12 is a schematic view of the preferred embodiment of the present invention shown in an intended environment making an angle determination of an acute angle.

Calling attention now to FIG. 11, a further preferred use of the present invention is shown. In FIG. 11, the top side 83 of the tool 70 abuts an angled roof member 33 of a truss 33. The user then presses the set button 96 to toggle between reference planes and select the horizontal reference plane parallel to the floor members 32. When the horizontal reference plane is selected and the correct angle is displayed on the level display 91, the user can then press the hold button 95 to lock the measured angle on the level display 91. Further, as shown in FIG. 12 in situations where the angle is particularly acute, the tool 70 can abut the roof member 33 anywhere along its length to determine the angle of the roof member 33 relative the horizontal floor member 32.

It is noted that in FIGS. 5–12, the present invention has been shown in four environments measuring obtuse and acute angles from the left and from the right, and that in each preferred environment, the display panel 90 has been viewable to the user.

Figure 13:
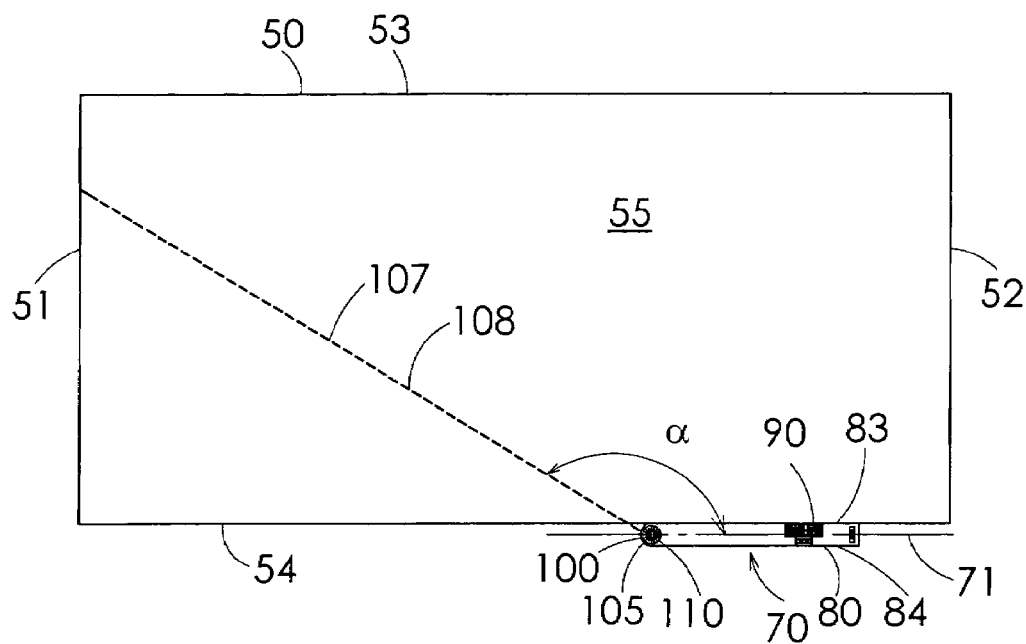
FIG. 13 is a schematic view of the preferred embodiment of the present invention shown in an intended environment projecting a laser line onto the surface of a sheet of material.

Turning now to FIG. 13, the present invention 80 is illustrated in relation to a sheet of material 50 having a first end 51, a second end 52, a first side 53, a second side 54 and a top surface 55. The present invention can fan a laser line 108 across the top surface 55 of the material 50. To accomplish this, the top side 83 of the tool 80 is abutted against side 54 of the material 50 at a selected location along the length of the side of material so that the longitudinal axis 71 of the tool 70 is parallel with the side 54 of the material. Then, the dial 110 is rotated to a selected angle, an obtuse angle alpha in FIG. 13, which can also sill be displayed on the level display 91. The laser beam 107 is then projected through the opening 106 in the head 105 and a fanning line 108 is struck across the top surface 55 of the material 50 at the selected angle. In the preferred environment, when the side 54 of the material 50 abuts or contacts the side 83 of the body 80, the front surface 55 of the sheet of material 50 is located between the front surface 81 and the back surface 82 of the tool. It is understood that the head 105 of the dial 100 could need to extend further or shorter from the front surface 81 of the body depending on the application.

Figure 14:
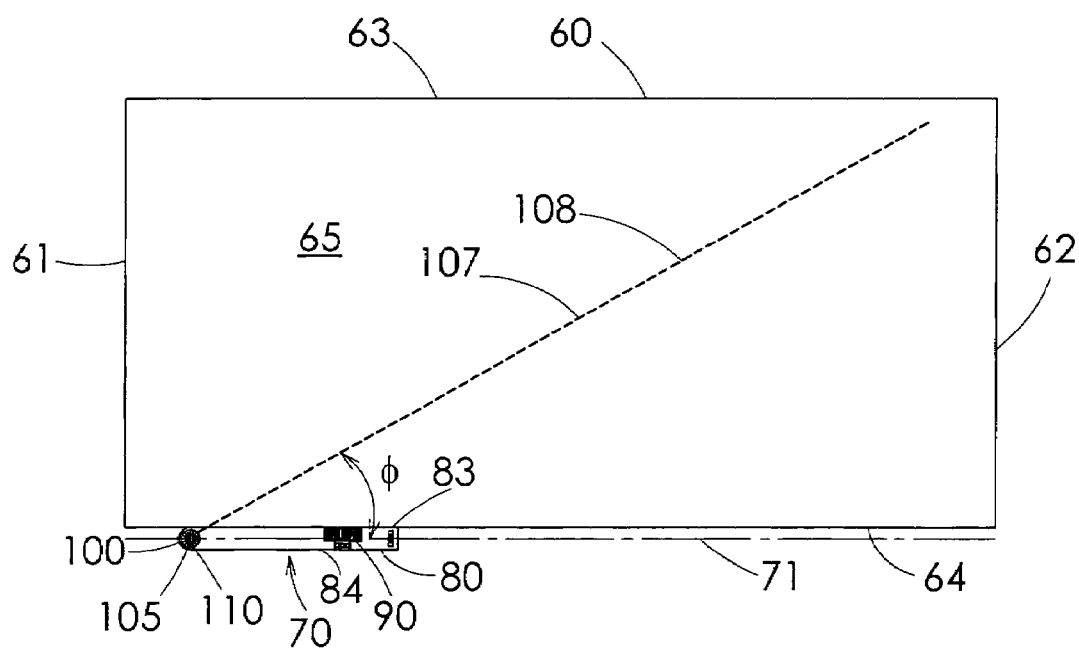
FIG. 14 is a schematic view of the preferred embodiment of the present invention shown in an intended environment projecting a laser line onto the surface of a sheet of material.

Turning now to FIG. 14, the present invention 80 is illustrated in relation to another sheet of material 60 having a first end 61, a second end 62, a first side 63, a second side 64 and a top surface 65. The present invention can fan a laser line 108 across the top surface 65 of the material 60. To accomplish this, the top side 83 of the tool 80 is abutted against side 64 of the material 60 at a selected location along the length of the side of material so that the longitudinal axis 71 of the tool 70 is parallel with the side 64 of the material. Then, the dial 110 is rotated to a selected angle, an acute angle phi in FIG. 10. The laser beam 107 is then projected through the opening 106 in the head 105 and a fanning line 108 is struck across the top surface 65 of the material 60 at the selected angle. In the preferred environment, when the side 64 of the material 60 abuts or contacts the side 83 of the body 80, the front surface 65 of the sheet of material 60 is located between the front surface 81 and the back surface 82 of the tool. It is understood that the head 105 of the dial 100 could need to extend further or shorter from the front surface 81 of the body depending on the application.

Thus it is apparent that there has been provided, in accordance with the invention, a laser tool that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A laser tool comprising:
    a body having a first end and a second end, a longitudinal axis, a front surface between said first end and said second end and lying in a front surface plane, and a back surface opposed to said front surface, said front surface defining a front surface area;
    a dial having a housing connected to said front surface of said body and operable within said front surface area, said housing having a laser beam selectably projected there from; and
    a processor being in electrical communication with said dial, said processor being capable of determining a first angle between said laser beam and said longitudinal axis and determining a second angle between said longitudinal axis and level; and
    a display for simultaneously displaying said first angle and said second angle.

2. The laser tool of claim 1 wherein said dial is rotatably connected to said front surface of said body.

3. The laser tool of claim 2 wherein said dial is rotatable 360 degrees with respect to said body.

4. The laser tool of claim 1 wherein said dial is at said first end of said body.

5. The laser tool of claim 1 wherein said display further comprises a level display and a set button, wherein said set button toggles between a plurality of preselected reference planes and wherein said level display displays the angle between said longitudinal axis and said selected reference plane.

6. The laser tool of claim 1 wherein said dial extends forward from said front surface, whereby said laser beam can mark a line across a front surface of an adjacent piece of material when a side of the adjacent piece of material contacts said body between said front surface and said back surface.

7. The laser tool of claim 1 wherein:
    said processor selectably stores multiple angles, and is capable of later selectably displaying one or more of said stored multiple angles on said display.

8. A laser tool comprising:
    a body having a front surface, a rear surface and a longitudinal axis, said front surface lying in a front surface plane;

a housing rotatably connected to said body and extending forward of said front surface of said body, said housing comprising an opening through which a laser beam is selectably projectable at a selected angle relative to said longitudinal axis and lying in a plane generally parallel to said front surface plane;

a processor in electrical communication with said housing, said processor being capable of measuring the angle between said laser beam and said longitudinal axis, and storing a selected number of measurements; and a display for selectably displaying the measurements stored by the processor, wherein said display has a laser display for displaying the angle between said laser beam and said longitudinal axis as determined by said processor and said display has a level display for displaying the anile between said longitudinal axis and a determined reference plane as determined by said processor.

9. The laser tool of claim 8 wherein:
said front surface defines a front surface area; and
said housing comprises a dial that is operable in said front surface area.

10. The laser tool of claim 8 wherein said housing is rotatable 360 degrees.

11. The laser tool of claim 8 wherein said body has a first end and an opposed second end, and said housing is at said first end of said body.

12. The laser tool of claim 11 wherein said laser tool has a length of approximately 2 feet between said first end and said second end and said front surface has a height of approximately 2.5 inches, and said housing is generally circular shaped with a diameter of approximately 2 inches.

13. The laser tool of claim 8 wherein said laser beam can mark a line across a front surface of an adjacent piece of material when a side of the adjacent piece of material contacts said body between said front surface and said back surface.

* * * * *